Nov. 22, 1966  A. FERRARI  3,286,583

COLORIMETER FLOW CELL AND HOLDER

Filed June 22, 1962

INVENTOR.
ANDRES FERRARI
BY Harry Cole
ATTORNEY

United States Patent Office 3,286,583
Patented Nov. 22, 1966

3,286,583
COLORIMETER FLOW CELL AND HOLDER
Andres Ferrari, Scarsdale, N.Y., assignor to Technicon Instruments Corporation, Chauncey, N.Y., a corporation of New York
Filed June 22, 1962, Ser. No. 204,486
2 Claims. (Cl. 88—14)

This invention relates to a flow cell and holder therefor for use in a spectrophotometer, such as a Beckman DB spectrophotometer.

One object of the present invention is the provision of a holder for a flow cell which may be removably mounted in the spectrophotometer by a simple motion and which is resiliently held in its mounted position in a manner that permits its removal from the spectrophotometer by a simple motion.

Another object is to provide a flow cell and holder therefor wherein the flow cell can be removably mounted on the holder by a simple motion and wherein the flow cell is resiliently held in its mounted position in a manner which does not interfere with its removal from the holder by a simple motion.

Another object is generally to provide an improved flow cell and holder therefor for spectrophotometers.

The above and other objects, features and advantages of the invention will be more clearly understood from the following description of the invention considered in connection with the accompanying illustrative drawings.

Figure 1:
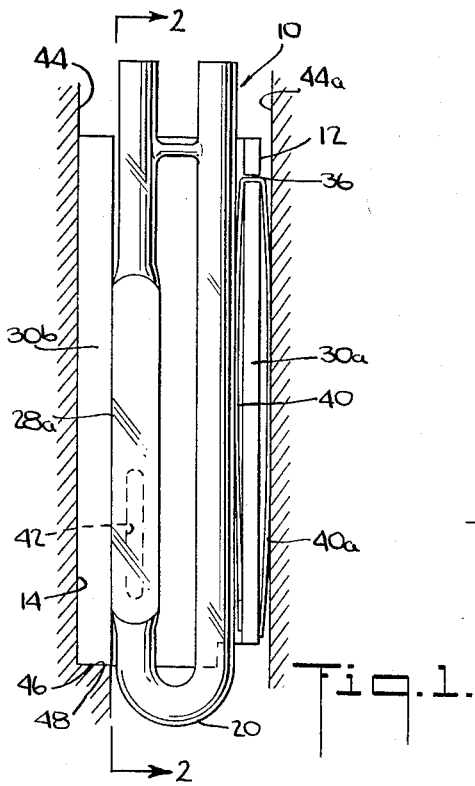
FIG. 1 is a vertical view of a flow cell and its holder mounted in a spectrophotometer.
Figure 2:
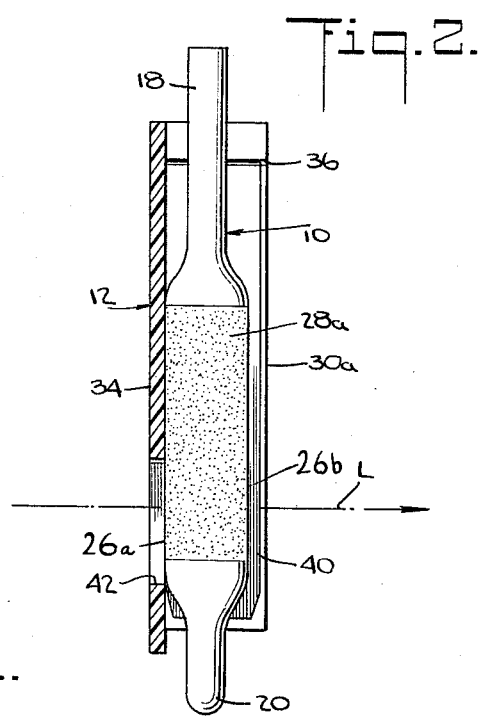
FIG. 2 is a vertical sectional view taken on line 2—2 of FIG. 1.
Figure 3:
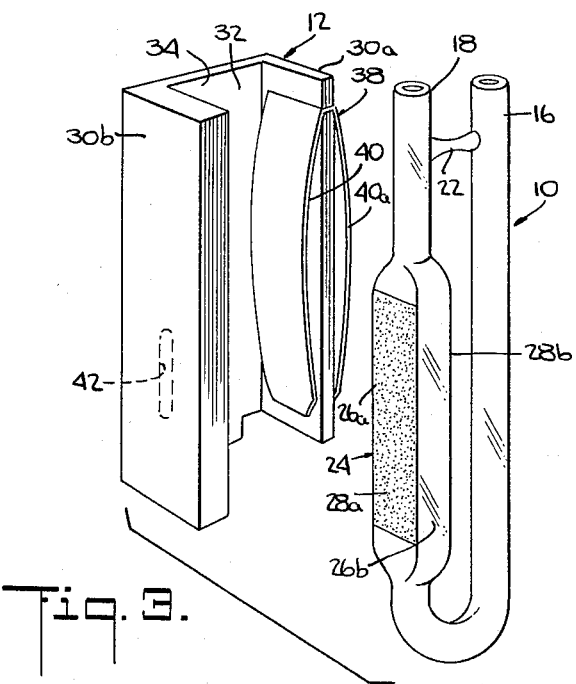
FIG. 3 is a perspective view of the flow cell and holder, separated from each other, and illustrating the operational relation therebetween.
Figure 4:
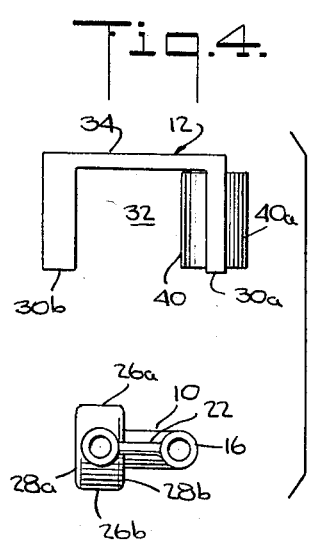
FIG. 4 is a top plan view of the flow cell and holder in their separated position.

Referring now to the drawings in detail, the flow cell 10 and its holder 12 are adapted to be removably mounted in a spectrophotometer 14, parts of which are illustrated in FIG. 1, for the spectrophotometer examination of a fluid stream which is transmitted through the flow cell. The flow cell is preferably made of glass of the type sold under the trademark "Pyrex" or of quartz for UV and is of U-shaped construction comprising a pair of longitudinally extending laterally spaced tubular arms 16 and 18 connected at their bottoms, in fluid flow communication with each other, by a reflexed tubular part 20. The upper ends of the arms of the flow cell are adapted to be connected to suitable tubing for transmitting the fluid stream to and from the cell for the colorimetric examination of the stream during its flow. A reinforcing cross member 22 extends between the upper parts of the arms and is connected to said arms to prevent movement of the upper parts of the arms with respect to each other.

Arm 18 is formed with a fluid examining part 24 which comprises a pair of longitudinally extending light-permeable walls 26a and 26b which are spaced from each other in the direction of the light path L.

Another pair of longitudinally extending flat walls 28a and 28b extend perpendicularly between walls 26a and 26b and form with the latter, the fluid examining chamber of the flow cell.

The cell holder 12 comprises a pair of longitudinally extending laterally spaced flat sides 30a and 30b which form a space 32 for receiving the flow cell. A wall 34 extends between and connects the sides of the holder at the rear thereof, and the front of the holder is open. A slot 36 is provided in the upper part of side 30a for supporting a spring member 38 which has an elongated spring part 40 that extends downwardly from the slot along a curve so that its center portion extends into space 32 and its lower end engages the inner wall of side 30a. The spring member has another spring part 40a which extends downwardly from slot 36 along the outer wall of side 30a in the exact same manner as described with respect to spring part 40. It will be apparent that spring member 38 may be mounted by mere endwise movement of the member into slot 36. Wall 34 is provided with an elongated slot 42 to permit passage of the light L through the holder.

The flow cell is mounted on its holder by moving it downwardly or upwardly between the inner flat walls of sides 30a and 30b of the holder so that flat wall 28a of the cell engages the inner flat wall of side 30b, and spring part 40 engages the adjacent side of arm 16 of the flow cell, as seen in FIG. 1, whereby the flow cell is resiliently biased by the spring against side 30b of the holder and in this manner is resiliently held in position in the holder.

The holder is mounted in the spectrophotometer in a similar manner between laterally spaced walls 44 and 44a (FIG. 1) of the spectrophotometer, so that spring part 40a engages wall 44a and biases side 30b of the holder against wall 44, whereby the holder is resiliently held in position in the spectrophotometer. The lower edge 46 of the holder can rest against a supporting surface 48 of the spectrophotometer.

Obviously, the flow cell and holder can be removed from the spectrophotometer by movements which are opposite to the above described movements of the flow cell and holder for mounting the latter in the spectrophotometer.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:

1. Apparatus for the colorimetric examination of a fluid stream, comprising:
   (a) a flow cell holder adapted to be removably mounted in a spectrophotometer and having a pair of laterally spaced and longitudinally extending confronting side members, providing a space therebetween,
   (b) a tubular flow cell removably mounted on said holder in said space,
   (c) said tubular flow cell having a longitudinally extending side wall for providing a flow path and at least one portion of said side wall being light permeable,
   (d) an elongated spring member mounted on one of said side members and in engagement with a portion of said side wall of said flow cell different from said light permeable side wall portion,
   (e) another side wall portion different from said light permeable side wall portion of said flow cell being in engagement with the other side member of said holder for resiliently holding said flow cell in said mounted position on said holder, and
   (f) another elongated spring member mounted on one of said side members of said holder for engaging a part of said spectrophotometer for resiliently holding said holder in said mounted position in said spectrophotometer.

2. Apparatus for the colorimetric examination of a fluid stream, comprising:

(a) a flow cell holder adapted to be removably mounted in a spectrophotometer and having a pair of laterally spaced and longitudinally extending confronting side members providing a space therebetween, (b) a flow cell removably mounted on said holder in said space, (c) said flow cell having a pair of laterally spaced longitudinally extending parts in fluid flow communication with each other for providing a flow path for the fluid through the flow cell, (d) one of said parts having light-permeable wall parts spaced from each other in the direction of the light path to permit the transmission of light therethrough for the colorimetric examination of the fluid during its flow between said wall parts, (e) said one part having a longitudinally extending wall part in engagement with the adjacent side member of said holder, (f) an elongated spring member mounted on said other side member of said holder and in engagement with the other part of said flow cell for resiliently holding said flow cell in said holder, and (g) another elongated spring member mounted on one of said side members of said holder for engaging a part of said spectrophotometer for resiliently holding said holder in said mounted position in said spectrophotometer.

References Cited by the Examiner

UNITED STATES PATENTS

| | | | |
|---|---|---|---|
| 2,980,512 | 4/1961 | Petersen | 88—14 X |
| 2,999,417 | 9/1961 | Isreeli | 88—14 |
| 3,109,714 | 11/1963 | Skeggs | 88—14 X |

OTHER REFERENCES

Neu: Construction of a Dual Beam Heated Infrared Cell, Journal of the Optical Society of America, vol. 43, No. 6, June 1953, pp. 520–521.

JEWELL H. PEDERSEN, *Primary Examiner.*

T. L. HUDSON, O. B. CHEW, *Assistant Examiners.*